United States Patent [19]
Recker

[11] 3,992,120
[45] Nov. 16, 1976

[54] SHAFT COUPLING

[76] Inventor: Florian B. Recker, 802 First St., SE., Dyersville, Iowa 52040

[22] Filed: Mar. 13, 1975

[21] Appl. No.: 558,138

[52] U.S. Cl. .............................. 403/317; 403/322; 403/359; 285/316; 64/6
[51] Int. Cl.² .......................................... F16B 7/00
[58] Field of Search ........... 403/322, 325, 359, 316, 403/317, 327; 285/316, 85, 86, 308, 315, 317, 314; 64/6, 32 R, 4

[56] References Cited
UNITED STATES PATENTS

| 2,135,223 | 11/1938 | Scheiwer | 285/111 |
| 2,898,130 | 8/1959 | Hansen | 285/317 X |
| 3,179,450 | 4/1965 | Recker | 403/325 |
| 3,480,310 | 11/1969 | McElwain | 403/322 |
| 3,856,336 | 12/1974 | Karcher | 285/318 |

FOREIGN PATENTS OR APPLICATIONS

| 1,102,886 | 5/1955 | France | 403/322 |

Primary Examiner—Andrew V. Kundrat
Attorney, Agent, or Firm—Henderson, Strom & Sturm

[57] ABSTRACT

Apparatus for connecting one shaft to another shaft wherein one of the shafts has a plurality of splines or grooves around the periphery thereof, an intermediate portion of the splined shaft having the splines removed. A housing is adapted to be connected to the other shaft of the coupling and has a central opening therein with splines and grooves around the periphery thereof to mate with the splines and grooves of the first mentioned shaft. A sleeve, also having complimentary splines and grooves therein, is rotatably received within the interior of the housing adjacent the inner end of the splined and grooved section of the housing opening. A collar is disposed about an outer portion of the housing and is interlocked with the sleeve so that rotary motion of the collar results in a similar rotary motion of the sleeve. A partially circular snap ring member is constructed of spring steel and is also disposed around the housing adjacent the collar. One side of the partially circular member being attached to the collar and another side of the semicircular member being attached to the housing. This semicircular member so attached to the collar and housing serves to bias the splines and grooves on the interior of the housing opening. Rotary movement of the collar in a direction opposing the spring forces of the partially circular member will move the splined sleeve to a position wherein the splines and grooves of the splined sleeve are aligned with the splines and grooves within the opening in the housing.

9 Claims, 8 Drawing Figures

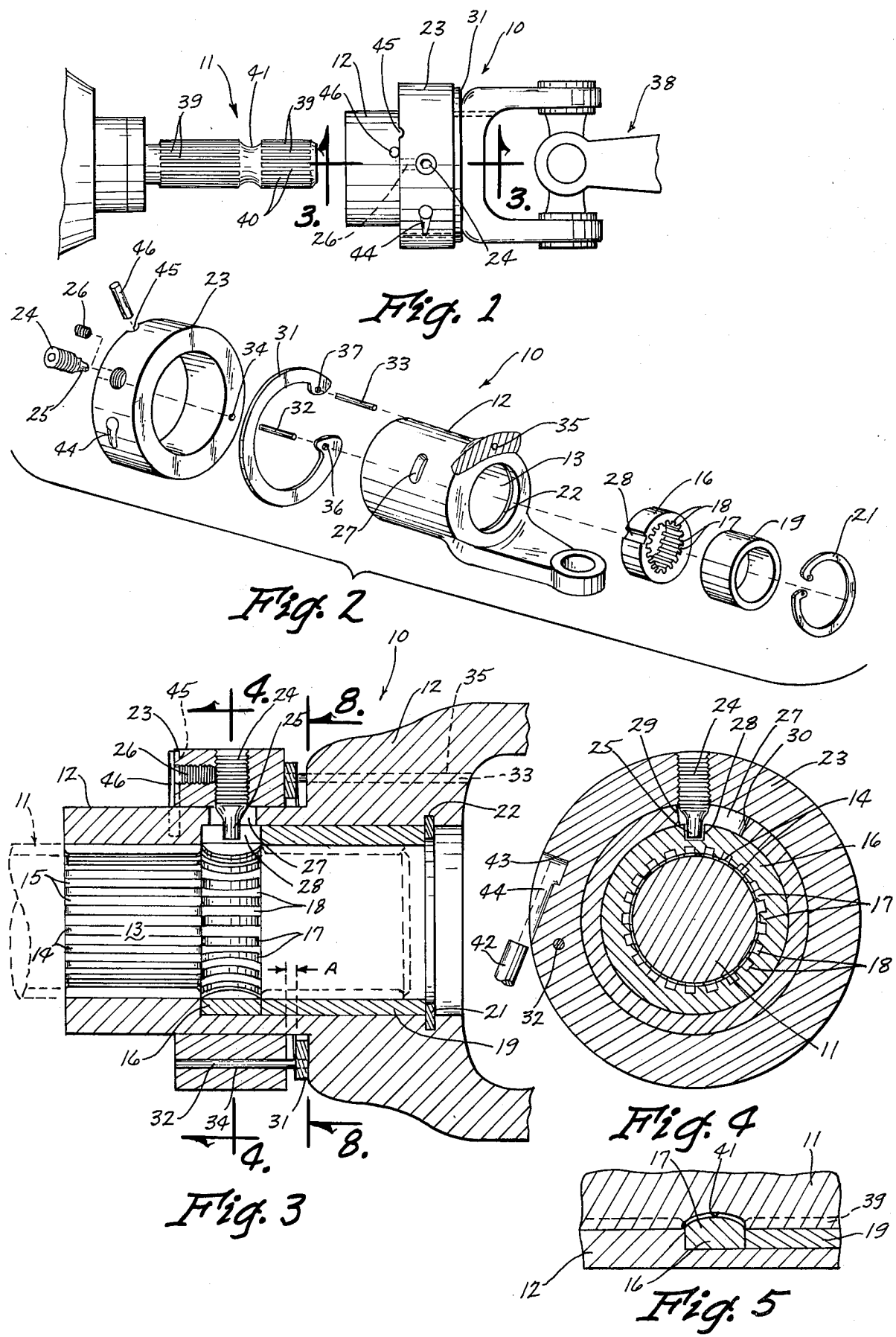

SHAFT COUPLING

BACKGROUND OF THE INVENTION

The present invention relates generally to shaft couplings and more particularly to a shaft coupling for transmitting a torque force from one shaft to another. The problem of how to couple one shaft to another for transmitting a torque force is a long-standing one. This has particularly been a problem in the farming community wherein the power take-off of an agricultural tractor frequently needs to be connected and disconnected to utilize one implement and then another. This problem has been solved in the past in one degree or another, and one of the most commercially successful of these solutions is a connection of the type disclosed in U.S. Pat. No. 2,448,278, which was patented in 1948.

In U.S. Pat. No. 2,448,278 a pin is biased to one position within a housing so that it will contact one spline of a power take-off to thereby hold the coupling together. In another position of the pin, it is moved so that it does not block or contact any of the splines and thereby allows the housing to be removed from the power take-off shaft.

Since the time that the coupling disclosed in U.S. Pat. No. 2,448,278 was developed, the horsepower rating of typical agricultural tractors has continued to increase. Because of the very high torque which can be developed from the power take-offs of modern day agricultural tractors, it is desirable that the coupling be held at more than one point and on more than one spline.

Additionally, it is highly desirable to have a coupling which has no external projections thereon, to prevent such projections from catching a tractor operator's clothes or body limbs. It is for this reason that many various types of shields and guards have been developed to be placed around the couplings of the type shown in U.S. Pat. No. 2,448,278. It has been found, however, that these shields are often removed, or not used at all, because of the inconvenience they cause when a person is trying to get the coupling on and off of a tractor power take-off shaft. Consequently, if the coupling could be designed to be smooth and circular, it would pose less of a safety hazard, whether the safety shield was on or off.

While certain couplers have been developed to avoid these projections, for example as shown in U.S. Pat. No. 3,480,310, there has not been a commercial coupling having the positive coupling to each and every spline which is highly desirable for the high horsepower tractors of today. Furthermore, in trying to eliminate the projections, some of the couplings developed have become unduly complicated and uneconomical to manufacture.

A French Pat. No. 1,102,886, patented in 1955 discloses a design for locking on all of the splines of a power take-off shaft but it has not become a commercial success, at least not in this country, presumably because of its somewhat complicated structure for positioning and biasing the locking splines.

SUMMARY OF THE INVENTION

The present invention relates to a torque transmitting coupling having a housing adapted to receive a noncircular shaft into a complimentarily shaped noncircular opening in the housing. A sleeve, also of a shape complimentary to the shaft and housing, is rotatably disposed within a portion of the opening. A collar is disposed around the housing and is interlocked with the sleeve so that rotary movement of the collar controls rotary movement of the sleeve. A semicircular spring steel member is attached at one end to the collar and at the other end thereof to the housing to thereby bias the collar and thereby the sleeve to a first position. In this first position the sleeve is misaligned with the remainder of the noncircular opening in the housing. Rotary movement of the sleeve to its other extreme or second position will then serve to align the sleeve's inner opening exactly with the noncircular configuration of the opening in the housing. Consequently, movement of the collar to the second position allows the housing of the torque transmitting coupling to be slid completely onto the shaft and release of the collar allows the semicircular biasing mechanism to move the collar and sleeve into a locking position. By utilizing a reverse process, the housing may be quickly and easily removed from the shaft.

An object of the present invention is to provide a torque transmitting coupling which will withstand a very high torque force.

Another object of the invention is to provide a torque transmitting coupling which is extremely easy and simple to couple and uncouple.

A further object of the invention is to provide a torque transmitting coupling which has a smooth outer surface, without any hazardous projections thereon.

Still another object is to provide a torque transmitting coupling which is both dependable to use and economical to produce.

A still further object of the present invention is to provide a torque transmitting coupling which is compact, as distinguished from being unduly bulky.

Other objects, advantages, and novel features of the present invention will become apparent from the following detailed description of the invention when considered in conjunction with the accompanying drawings.

BRIEF DESCRIPTION OF THE DRAWINGS

FIG. 1 shows a side or plan view of the present invention shown in an unlocked position in readiness to be connected to a tractor power take-off shaft;

FIG. 2 is an exploded perspective view of the present invention;

FIG. 3 is a cross sectional view of the present invention taken along line 3—3 of FIG. 1, but showing the present invention in a locked position;

FIG. 4 is a cross sectional view taken along line 4—4 of FIG. 3 showing the device in a locked position;

FIG. 5 is a partial cross sectional view taken along line 3—3 of FIG. 1, and showing the device in a locked position;

DESCRIPTION OF THE PREFERRED EMBODIMENT

Figure 6:
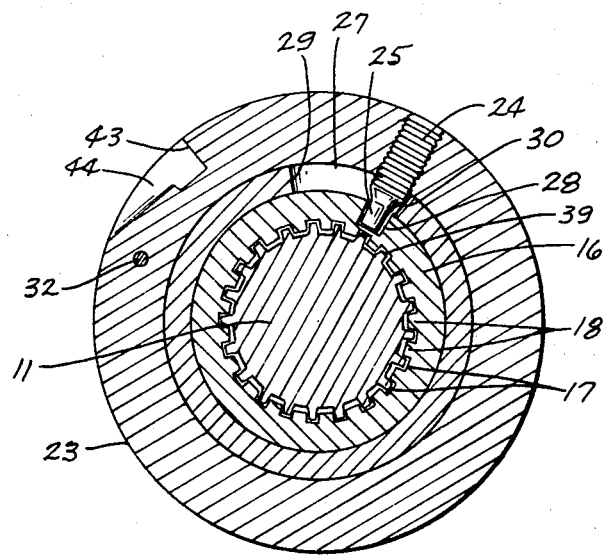
FIG. 6 is a cross sectional view like FIG. 4, but showing the device in an unlocked position.

Referring now to the drawings wherein like reference numerals designate identical or corresponding parts throughout the several views, FIG. 1 shows a preferred embodiment of the coupling 10 in readiness to be attached to the power take-off shaft 11 of a tractor.

The coupling 10 of the present invention is comprised basically of a housing 12 having an opening 13 passing therethrough. One end of the opening 13 has a series of evenly spaced splines 14 and grooves 15 longitudinally disposed therealong. A sleeve 16 is rotatably disposed within the opening 13 and has a series of splines 17 and grooves 18 disposed around the inner periphery thereof and having the same general spacing and configuration as splines and grooves 14 and 15 respectively in the housing 12. The splined sleeve 16 is held in place by a spacer sleeve 19, which is, in turn, locked into position by a snap ring 21 which fits into a groove 22 in one end of the opening 13 of the housing 12.

Rotatably received around the circular part of the housing 12 is a collar 23. This collar 23 is interlocked with the splined sleeve 16 by the structure shown in FIG. 3, for example. This locking structure includes a screw threaded device 24 having a dog 25 on one end thereof. This threaded device 24 has a recessed Allen or other type of screw head in order to facilitate selective movement thereof. A set screw 26 in the collar 23 is also screwed into place in abutment with the threaded device 24 so as to ensure that threaded device 24 does not become loose or dislodged. It is to be understood, however, that other types of interlocking means may be used instead of a threaded pin such as 24. The dog 25 extends through a slot 27 in the housing 12 and into a slot 28 in the splined sleeve 16. This structure serves to positively lock the collar 23 to the splined sleeve 16 such that movement of the collar 23 will positively move the spline sleeve 16 as desired. The ends 29 and 30 (FIGS. 4 and 6) of the slot 27 in the housing 12 serve to limit the extreme positions of the splined sleeve 16 and the collar 23.

A partially circular member 31 is made of spring steel and is also disposed around the housing 12 adjacent to the collar 23. This partially circular member may be a conventional snap ring like snap ring 21. The partially circular member 31 is connected on one end thereof to the collar 23 by a pin 32 (FIG. 3) and on the other end thereof of the partially circular member 31 is connected by a pin 33 to the housing 12. The holes 34 in the collar 23, 35 in the housing 12 and holes 36 and 37 in the semicircular member 31 are provided for the purpose of making these two connections.

A radial notch 45 (FIGS. 1 and 3) is optionally formed in the collar 23. This notch 45 is designed to cooperate with a pin 46 which is solidly affixed to the housing 12. If the notch 45 and the pin 46 are utilized, then the snap ring member 31 is intentionally bent so that the ends are initially a distance A (FIG. 3) apart. By so modifying the snap ring 31, it acts as a compression spring to bias collar 23 to the left as shown in FIG. 3, which will thereby hold the pin 46 in the slot 45 once pin 46 is received in slot 45. A separate spring (not shown) may be alternatively be substituted for the step of bending the snap ring 31.

In operation, the tractor would be backed up to an implement having the coupler 10 of the present invention attached thereto through the universal joint 38 (FIG. 1). The tractor operator would first be sure that the power take-off was disengaged, such that the splines 39 and the grooves 40 of the shaft 11 are not in motion. The collar 23 would then be rotated from the locked position as shown in FIGS. 3, 4 and 5, to which it is normally biased by the snap ring member 31, to the unlocked position shown in FIGS. 1, 6 and 7, noting that this movement moves the relative position of the pin 46 from a position wherein it is received in notch 45 (FIG. 3) to a position wherein it is spaced from the notch 45 and merely abuts the left edge of the collar 23 as shown in FIG. 1. The coupler 10 is then manually slid onto the tractor's power take-off shaft 11. Once the coupler 10 has been slid completely onto the power take-off shaft 11, the collar 23 is then released, and the sleeve 16 will return to the locked position shown in FIGS. 3, 4 and 5, wherein the pin 46 is received into the notch 45 (FIG. 3). In certain instances this movement from an unlocked to a locked position may need to be assisted manually. (It is to be understood that the splined sleeve 16 rotates to and from its extreme positions within the space 41 of the splined sleeve 11). Once this locking of the coupling has been accomplished, the tractor operator is then free to mount the tractor, engage the power take-off and then proceed to utilize the implement connected to the tractor.

Figure 7:
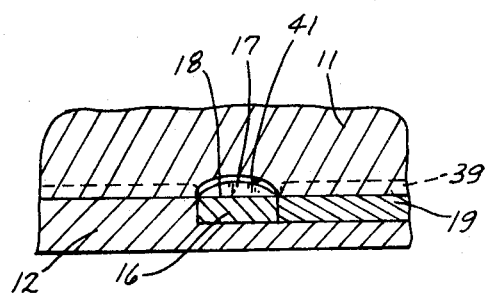
FIG. 7 is a view like FIG. 5, but showing the device in an unlocked position.
Figure 8:
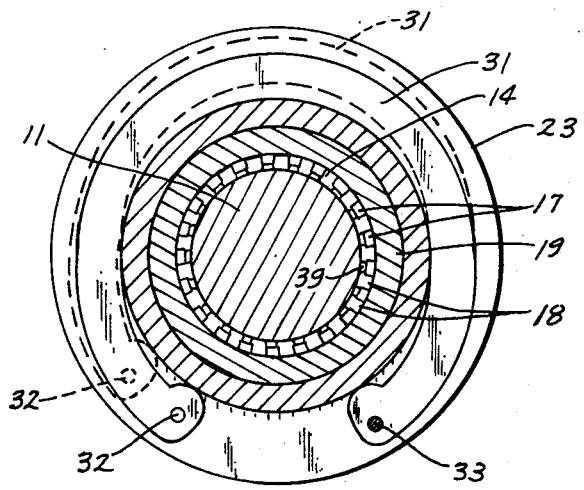
FIG. 8 is a cross sectional view taken along line 8—8 of FIG. 3.

When it is desired to disconnect the implement from the power take-off shaft 11, the process mentioned above is reversed, whereby the tractor operator would disengage the power take-off, rotate the collar 23 manually from the position shown in FIGS. 4 and 5 to the position shown in FIGS. 6 and 7 and, while holding the collar in the position of FIGS. 1 and 6, pull the coupling 10 with a sliding movement away from the power take-off shaft 11. If for any reason it is difficult to manually move the collar 23 and the splined sleeve 16 from the position of FIG. 4 to the position of FIG. 6, a punch 42 can be utilized to abut the surface 43 in groove 44 of the collar 23. This optional groove 44 will then easily facilitate movement of the collar 23, if any manual difficulty is encountered. It is also important to note that again the notch 45 and the pin 46 are, along with the bent snap ring 31, strictly optional features, and that the coupling will work with a conventional flat, partially circular snap ring 31. It is, however, highly desirable to utilize these additional features on the coupling to ensure a positive locking of the coupling, so that initial accelerated turning or very quick stopping of the power take-off shaft could not possibly effect an unlocking of the coupling.

Accordingly, it is noted that exceptional coupling concepts are disclosed herein which when utilized, serve to accomplish all of the objects mentioned above. Obviously many modifications and variations of the present invention are possible in light of the above teachings. For example, the locking and unlocking directions could obviously be reversed with a slight rearrangement of the parts of the illustrated embodiment. It is therefore to be understood that, within the scope of the appended claims, the invention may be practiced otherwise than as specifically described.

I claim:
1. A torque transmitting coupling comprising:
   a housing;
   an opening in said housing, a portion of said opening being circular and a portion of said opening being noncircular, said opening being adapted to receive a noncircular portion of a shaft;
   a sleeve rotatably disposed within said circular portion of said opening, the inner configuration of said sleeve being of the same general shape as the shape of the noncircular portion of the opening in the housing;
   a collar surrounding a portion of said housing;

means for interlocking the collar and the sleeve, whereby rotary movement of the collar effects rotary movement of the sleeve; and a partially circular member being connected adjacent one end thereof to said collar and adjacent the other end thereof to said housing, said partially circular member being a substantially flat member lying in one plane.

2. A torque transmitting coupling as defined in claim 1 wherein said partially circular member is constructed of spring steel.

3. A torque transmitting coupling as defined in claim 1 wherein said partially circular member is substantially the shape of a conventional snap ring.

4. A torque transmitting coupling as defined in claim 1 wherein said noncircular portion of the opening in said housing has a series of equidistantly spaced longitudinal grooves and splines around the inner periphery thereof.

5. A torque transmitting coupling as defined in claim 4 wherein a shaft is adapted to be received in the noncircular portion of the opening in the housing, said shaft having a shape complimentary to the groove and spline shape of said opening and further having an intermediate annular section of said shaft with the splines removed, said annular section being adapted to receive a portion of said sleeve.

6. A torque transmitting coupling as defined in claim 5 wherein said shaft has twenty-one splines about the periphery thereof.

7. A torque transmitting coupling as defined in claim 5 wherein said shaft has six splines around the periphery thereof.

8. A torque transmitting coupling comprising:
a housing;
an opening in said housing, a portion of said opening being circular and a portion of said opening being noncircular, said opening being adapted to receive a noncircular portion of a shaft;
a sleeve rotatably disposed within said circular portion of said opening, the inner configuration of said sleeve being of the same general shape as the shape of the noncircular portion of the opening in the housing;
a collar surrounding a portion of said housing;
means for interlocking the collar and the sleeve, whereby rotary movement of the collar effects rotary movement of the sleeve;
a biasing member being connected adjacent one end thereof to said collar and adjacent the other end thereof to said housing;
a radial notch being disposed in one edge of the collar; and
a radial pin being disposed in the housing adjacent said one edge of the collar, whereby in one rotary position of the collar the radial pin is received in the notch and in another rotary position of the collar the pin is displaced from the notch.

9. A torque transmitting coupling as defined in claim 8 wherein said biasing member is partially circular and non-planer.

* * * * *